United States Patent [19]

Bando et al.

[11] Patent Number: 4,980,629

[45] Date of Patent: Dec. 25, 1990

[54] AC-EXCITED GENERATOR/MOTOR APPARATUS

[75] Inventors: Akira Bando, Hitachi; Osamu Nagura, Katsuta; Shigehiro Kayukawa; Junichi Shiozaki, both of Hitachi; Akira Momiyama, Hitachi; Hiroto Nakagawa, Osaka; Yasuteru Oono, Kobe, all of Japan

[73] Assignees: Hitachi, Ltd., Tokyo; The Kansai Electric Power Co., Inc., Osaka, both of Japan

[21] Appl. No.: 319,708

[22] Filed: Mar. 7, 1989

[30] Foreign Application Priority Data

Mar. 9, 1988 [JP] Japan .................................. 63-55518

[51] Int. Cl.$^5$ .............................................. H02P 5/28
[52] U.S. Cl. ..................................... 318/799; 318/52; 318/809
[58] Field of Search ........................... 318/798, 811, 52

[56] References Cited

U.S. PATENT DOCUMENTS

| | | | |
|---|---|---|---|
| 3,967,173 | 4/1975 | Stich | 318/811 |
| 4,072,221 | 2/1978 | Phinney | 137/596.14 X |
| 4,075,538 | 2/1978 | Plunkett | 318/72 X |
| 4,088,934 | 10/1976 | D'Atre et al. | 318/802 |
| 4,088,935 | 10/1976 | D'Atre et al. | 318/802 |
| 4,150,737 | 8/1977 | Dalton | 137/495 X |
| 4,160,940 | 7/1979 | Wolf | 318/803 |
| 4,263,542 | 4/1981 | Schulze et al. | 318/803 |
| 4,442,394 | 4/1984 | Beierholm et al. | 318/803 X |
| 4,544,873 | 10/1985 | Salihi et al. | 318/811 X |
| 4,641,075 | 2/1987 | Asano et al. | 318/811 |

Primary Examiner—William M. Shoop, Jr.
Assistant Examiner—David Martin
Attorney, Agent, or Firm—Antonelli, Terry, Stout & Kraus

[57] ABSTRACT

An AC-excited generator/motor apparatus comprising; an AC-excited generator/motor having an armature mounting thereon; an armature winding connected to an AC power system and a rotor mounting thereon; and an exciting winding excited by an AC current. An exciting device for supplying a controlled AC exciting current to the exciting winding comprises; a device for calculating a real slip frequency based on a difference between the phase of an armature voltage appearing on the armature winding and the rotational phase of the rotor; and a device for controlling the exciting current supplied to the exciting winding from the exciting means in response to a deviation of the real slip frequency from a predetermined allowable range of slip frequencies so as to restore the real slip frequency within the allowable range of slip frequencies.

19 Claims, 6 Drawing Sheets

AC-EXCITED GENERATOR/MOTOR APPARATUS

BACKGROUND OF THE INVENTION

1. Field of the Invention

The present invention is relating to an AC-excited generator/motor apparatus and more particular to an apparatus suitable for improving the stability of an AC power system such as a variable-speed pumping-up power system and a fly-wheel generator/motor system.

2. Description of the Related Art

In a conventional AC-excited generator/motor apparatus as disclosed in Japanese Patent Kokoku Sho Nos; 53-7628 and 57-60645, the exciting current is controlled for controlling active and reactive power for the AC-excited machine. Such an apparatus is useful as an active power regulator or reactive power regulator having a characteristic of fast response without hunting or stepping out of synchronization.

A variable-speed pumping-up power generator system in which a cycloconverter is used as a frequency converter for AC excitation and a pump turbine is directly connected to an AC-excited synchronous machine is suitable for adjusting frequency of a power system as disclosed in Record of the 1988 Kansai-Section Joint Convention of Institutes of Electrical Engineers of Japan. A similar system is disclosed in National Convention of Institutes of Electrical Engineers of Japan, No. 1026, 1986 and Japan Electric Association, Journal, Pages 34-39, March 1986.

Measures for establishing cooperation between an AC excitation control device and a pump turbine guide vane control device are disclosed in Japanese Patent Kokai Sho Nos. 62-71497, 62-72498 and 62-282169.

Control of such an AC-excited generator/motor apparatus useful when it is shut off from an AC power system is disclosed in Japanese Patent Kokai sho 63-43599.

In the AC-excited generator/motor apparatus as disclosed in any of the above references, the control of AC excitation is carried out by using as a reference signal the phase of voltage of the AC power system. However, none of the references teaches or discloses the control of AC excitation which is still effective when the apparatus is shut off from the AC power system, resulting in disappearance of the reference signal for control.

SUMMARY OF THE INVENTION

It is an object of the present invention to provide an AC-excited generator/motor apparatus having an armature mounting thereon an armature winding connected to an AC power system and a rotor mounting thereon an AC-excited exciting winding wherein the AC excitation of the exciting winding is controlled, when a slip frequency corresponding to the difference between the rotational phase of the rotor and the phase of the output voltage of the armature winding goes beyond a predetermined allowable range of slip frequencies, so as to restore the slip frequency within the allowable range.

It is another object of the present invention to provide an excitation system used with an AC-excited generator/motor apparatus having an armature mounting thereon an armature winding connected to an AC power system and a rotor mounting thereon an AC-excited exciting winding wherein if a slip frequency corresponding to the difference between the rotational phase of the rotor and the phase of an armature voltage appearing on the armature winding goes beyond a predetermined allowable range of slip frequencies, the AC excitation is controlled so as to restore the slip frequency within the allowable range.

In order to achieve the above objects, an AC-excited generator/motor apparatus according to the present invention comprises an AC-excited generator/motor having an armature mounting thereon an armature winding connected to an AC power system and a rotor mounting thereon an exciting winding; exciting means for supplying a controlled AC exciting current to the exciting winding; means for calculating a real slip frequency from a difference between the phase of an armature voltage appearing on the armature winding and the rotational phase of the rotor; and means for controlling the exciting current supplied to the exciting winding from the exciting means in response to a deviation of the real slip frequency from a predetermined allowable range of slip frequencies so as to restore the real slip frequency within the allowable range.

According to another aspect of the present invention, an excitation control system for use with an AC-excited generator/motor apparatus having an armature mounting thereon an armature winding connected to an AC power system and a rotor mounting thereon an exciting winding excited by an AC current comprises exciting means for supplying a controlled AC exciting current to the exciting winding; means for generating an active power control signal based on an active power command and an active power component transmitted between the AC power system and the armature winding; means for generating a voltage control signal based on an armature voltage appearing on the armature winding and a voltage command; means for generating an exciting current control signal applied to the exciting means for controlling the exciting current based on the active power control signal and the voltage control signal; means for calculating a real slip frequency based on a difference between the phase of the armature voltage and the rotational phase of the rotor of the generator/motor and means responsive to a deviation of the real slip frequency from a predetermined allowable range of slip frequencies for controlling the active power control signal so as to restore the real slip frequency within the allowable range.

DESCRIPTION OF THE PREFERRED EMBODIMENTS

Figure 1:
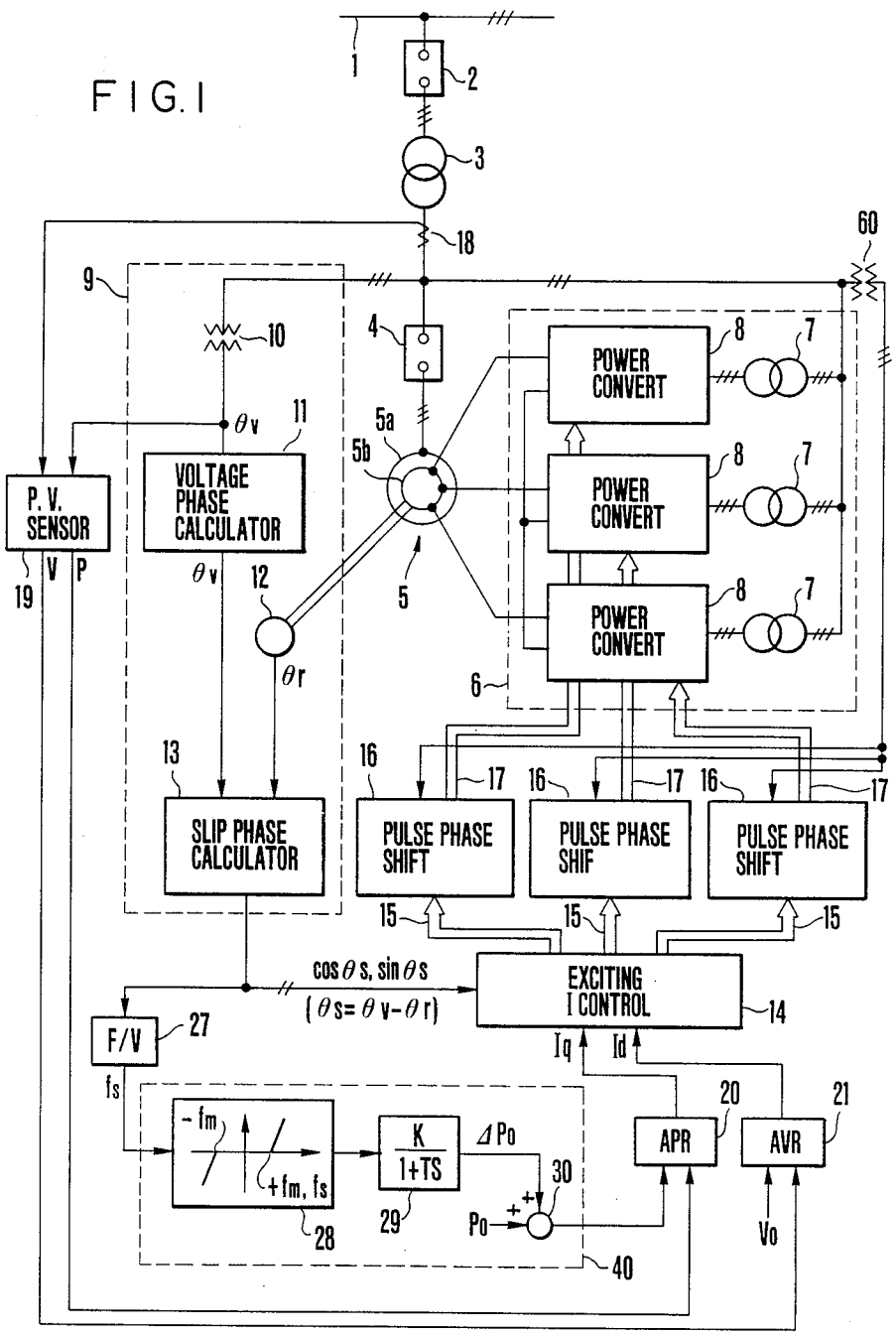
FIG. 1 is a block diagram of an AC-excited generator/motor apparatus as a first embodiment of the present invention.

An example of the conventional technique will be first described with reference to FIG. 5. An AC power system 1 is connected via a main circuit breaker 2 to a main transformer 3, of which a low voltage side is connected via a synchronizing circuit breaker 4 to an armature winding 5a of the synchronous machine 5. A frequency converter 6 is provided for converting the output voltage of the armature winding 5a or the low voltage of the main transformer 3 to an output having a voltage suitable for the AC excitation and a frequency controlled as mentioned hereinafter. The frequency converter 6 includes three units provided respectively to the three phases of the exciting winding 5b of the synchronous machine, each unit including an exciting transformer 7 connected to the low voltage side of the main transformer 3 for obtaining an AC voltage suitable for the AC excitation and thyristor power converter 8 which converts the output of the corresponding exciting transformer to a low-frequency AC power to be supplied to the exciting winding 5b. A phase detector 9 is provided for producing an AC excitation frequency signal and includes a potential transformer 10, a voltage phase calculator 11 which calculates a voltage phase $\theta v$ of the power system voltage based on an output of the potential transformer 10, a resolver 12 which is connected to the rotation axis of the rotor of the synchronous machine and detects an angular position of the rotor of the AC-excited synchronous machine 5 or the rotational phase $\theta r$ expressed by an electrical angle displaced from a predetermined reference angular position of the rotor and a slip phase calculator 13 for calculating a slip phase signal $\theta s = \theta v - \theta r$ from the voltage phase $\theta v$ and the rotational phase $\theta r$. An exciting current control unit 14 generates a firing angle signal 15 for each phase from the slip phase signal $\theta s$, a quadrature current command $I_q$ (active power control signal) obtained in a manner as will be described later, and an ordinate current command $I_d$ (voltage control signal) obtained also in a manner as will be described later. Each of three automatic pulse phase units 16 generates a firing pulse signal from the corresponding phase firing angle signal 15 and an AC reference signal having the same phase as that of the AC output of the synchronous machine 5 and supplied from a potential transformer 60 and provides the firing signal to the corresponding thyristor power converter 8. In the exciting current control unit 14, the quadrature current command $I_q$ is at the same phase as the slip phase $\theta s$ and controls the active power of the AC synchronous machine 5, while the ordinate current command $I_d$ is at a phase angle of 90° with the slip phase $\theta s$ and controls the reactive power component, and also the output voltage of the AC synchronous machine is controlled by the current commands $I_q$ and $I_d$, as disclosed in Japanese Patent Kokoku Sho Nos. 53-7628 and 57-6045.

The formation of the quadrature and ordinate current commands $I_q$ and $I_d$ will now be described. A PV sensor 19 produces direct current (DC) output signals P and V indicative of the active power and output voltage, respectively, of the AC power system 1 from the output signals of a current transformer 18 and a potential transformer 10 and provides these signals P and V to an automatic active power regulator (APR) 20 and an automatic voltage regulator (AVR) 21, respectively. The AVR 21 generates the ordinate current command $I_d$ from a voltage command $V_o$ externally supplied thereto and the DC signal V indicative of the voltage of the AC power system. Generally, a prime mover (not shown) such as a water wheel is directly coupled to the synchronous machine 5 and controls the rotational speed of the synchronous machine within an allowable range by adjusting the output thereof. However, if the output of the synchronous machine increases or decreases excessively, the rotational speed may go beyond the set range. In order to cope with this situation, there are provided a dead zone calculator 28 which generates, when the rotational speed of the synchronous machine indicated by a rotational speed signal outputted from a tachometer 22, a signal proportional to the deviation of the rotational speed from an upper or lower predetermined set limit a speed correction control unit 24 which generates a correction signal $\Delta P_o$ from the output signal of the blind zone calculator and an adder 30 which adds the correction signal $\Delta P_o$ to the active power output command $P_o$ to produce an active power correction command $P'_o$. Usually, the APR 20 generates the quadrature current command $I_q$ from the active power correction command $P'_o$ and the output signal P of the PV sensor 19.

If the main circuit breaker 2 is opened so that the synchronous machine 5 is shut off from the AC power system, the actual active power output value P becomes 0 regardless of the active power command $P_o$, so that the APR 20 may be out of order such as occurrence of saturation of an integrator provided therein. In order to prevent such situation, an over-speed relay 25 is provided such that if the relay is operated, it is determined that the synchronous machine is shut off from the AC system and thus a changeover unit 26 is operated so as to forcibly change the active power command $P_o$ to zero, and this zero command is applied to the APR 20.

The above prior art is not constituted so as to cope with changes in the frequency in the armature winding of the AC-excited synchronous machine caused if the synchronous machine is shut off from the AC power system. For example, there is a problem such that it is difficult to continue reliably the self-excited operation of the AC-excited generator/motor apparatus which may occur when the generator/motor apparatus is directly coupled to a water turbine and a load is shut off from the generator/motor. That is, when the generator/motor is shut off from the AC power system or a load, the active power output of the generator/motor is reduced to zero, and will not change even if the quadrature current command $I_q$ from the automatic active power regulator APR is corrected, while the rotational frequency $f_n$ will rapidly increase as shown by a solid line 61 in FIG. 6(a) in response to the shutting off of the load, and the output frequency $f_o$ of the generator/motor will increase more rapidly than the rotational frequency $f_n$ of its rotor as shown by a solid line 62, so that slip frequency $f_s$ will also increase. Thus, the speed correction control unit 24 corrects the quadrature current command $I_q$ so as to suppress the increase in the rotational frequency after the shutting off of the load. Therefore, as shown by a two-dot chain line 63 in FIG. 6(b), the slip frequency $f_s$ increases acceleratively to go beyond an operable slip frequency range to thereby disable the continuation of a stabilized operation by self-excitation.

Figure 4:
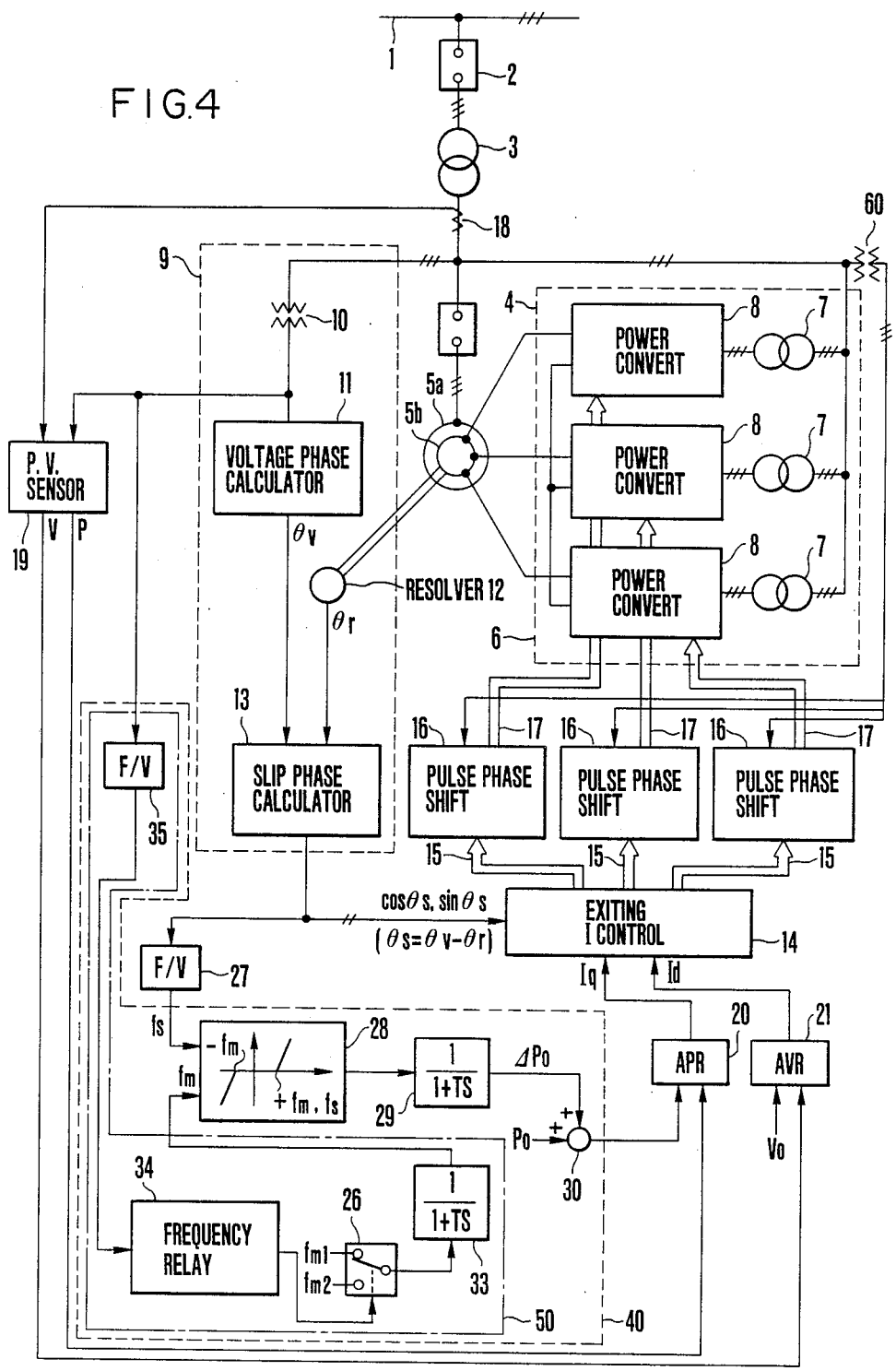
FIG. 4 is a block diagram of an AC-excited generator/motor apparatus as a fourth embodiment of the present invention.
Figure 5:
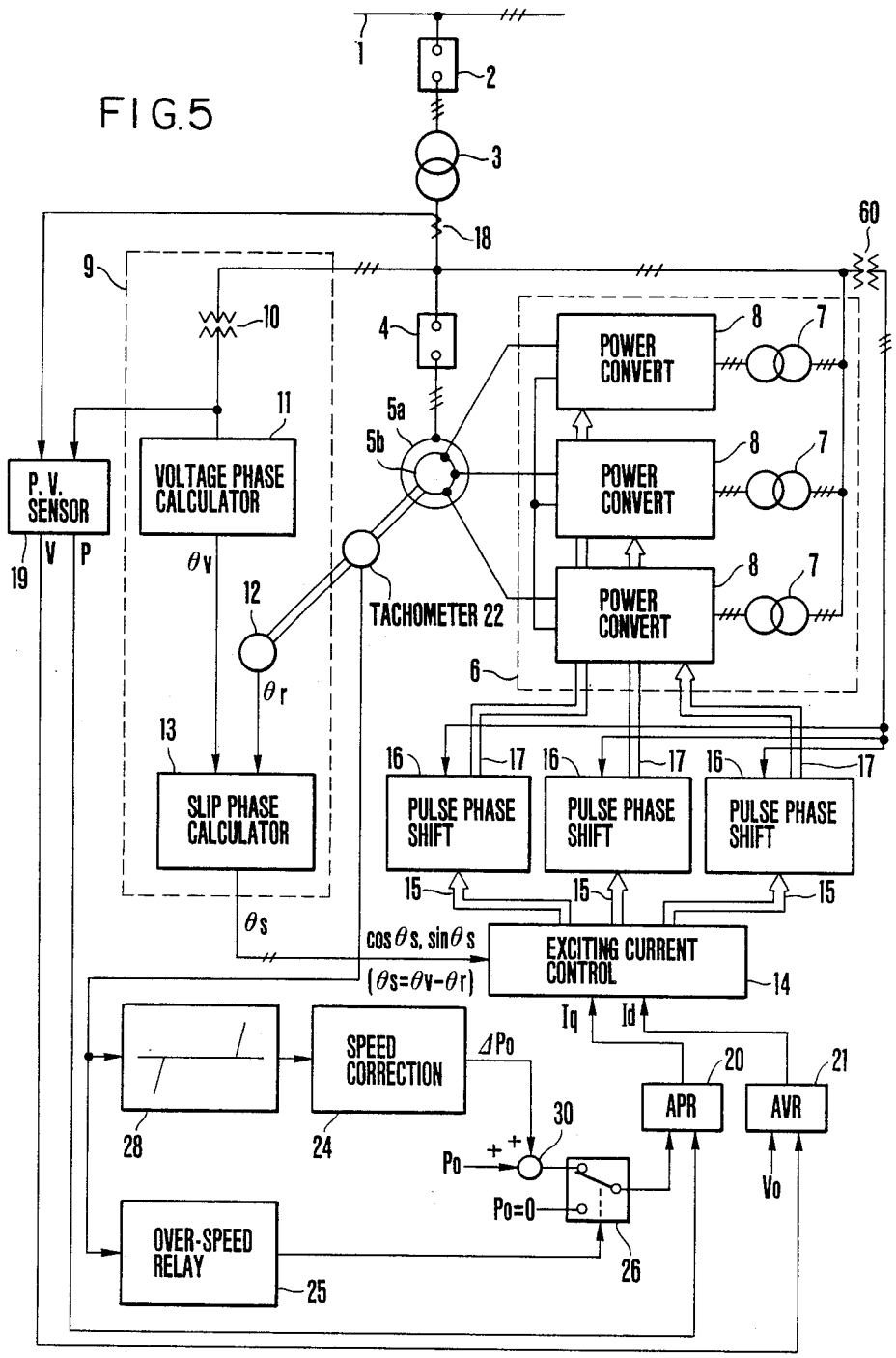
FIG. 5 is a block diagram of a conventional AC-excited generator/motor apparatus.

Embodiments of the present invention will now be described with reference to FIGS. 1-4 in which components similar to those in FIG. 5 are designated by the same reference numerals as those in FIG. 5.

FIG. 1 illustrates a first embodiment of the present invention, and portions of the embodiment different from those of the conventional apparatus shown in FIG. 5 will be mainly described.

In FIG. 1, a slip frequency control unit 40 includes a frequency-to-voltage converter 27 which receives a slip phase signal from a phase sensor 9 and converts it to a frequency signal $f_s$, a dead zone calculator 28 which receives the slip frequency signal $f_s$ and provides an output signal only when the slip frequency is deviated from a predetermined slip frequency range defined by upper and lower limits $+f_m$ and $-f_m$, i.e. when $f_s > +f_m$ or $f_s < -f_m$, a first-order time-lag calculator 29 which multiplies the output of the calculator 28 by a first-order time-lag function $$\frac{K}{1 + T_s},$$

where K is an amplification factor and $T_s$ is a first-order time-lag factor, thereby producing a correction signal $\Delta P_o$ obtained by performing a first-order time-lag operation on the received output, and an adder 30 which adds the correction signal $\Delta P_o$ to an active power output command $P_o$ externally applied thereto thereby producing a corrected active power command $P_o + \Delta P_o$, which is supplied to an automatic active power regulator 20 where $\Delta P_o$ and $Pp_o$ take a positive sign when it effects to accelerate the generator/motor.

When the armature winding of the AC-excited synchronous machine 5 is electrically connected to the AC power system 1, the armature voltage frequency $f_o$ is equal to the frequency of the AC power system, and the relationship between the rotational frequency $f_r$ and the slip frequency $f_s$ is given always by $f_o = f_r + f_s$. Generally, the frequency of the AC power system is almost constant, so that if the rotational frequence $f_r$ increases excessively, the slip frequency $f_s$ decreases excessively while if the rotational frequence $f_r$ decreases excessively, the slip frequency $f_s$ increases excessively. Therefore, the present embodiment which operates so as to restore the slip frequency $f_s$ within the preset range gives the same effect as the prior art which applies a correction signal to the active power regulator 20 so as to restore the rotational frequency $f_r$ within its preset range.

If the synchronous machine 5 is shut off from the AC power system 1, the armature voltage frequency $f_o$ is not restricted by the frequency of the AC power system. Also in this case, unless the relationship $f_o = f_r + f_s$ is established, a stabilized self-excitation operation cannot be expected. FIG. 6 shows experimental results as to how the armature voltage frequency $f_o$ will change if the synchronous machine 5 is shut off from the AC power system.

Figure 6A:
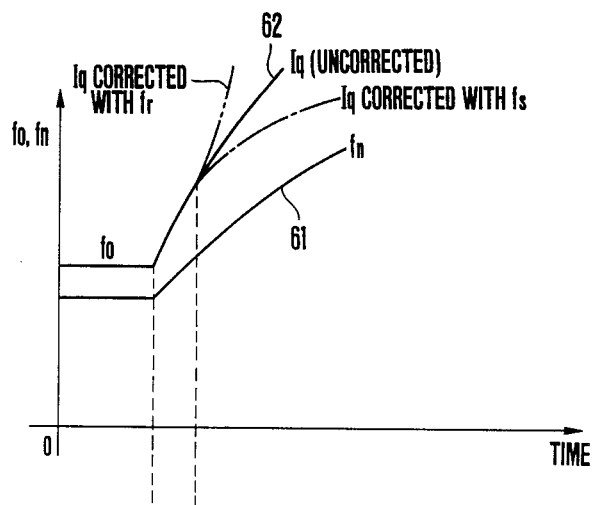
FIG. 6 is a diagram showing the comparison in frequency changes after the shutting off of the load between the AC generator/motor apparatus of the present invention and that of the prior art.

The rotational frequence $f_r$ rapidly increases upon shutting off of the load from the synchronous machine 5 when operated in the power generation mode. At this time, the armature voltage frequency $f_o$ increases, as shown in FIG. 6(a), more rapidly than the rotational frequency $f_r$. Therefore, the slip frequency $f_s$ changes so as to increase immediately after shutting off of the load as shown by the solid line 64 in FIG. 6(b). Therefore, the change of the slip frequency $f_s$ is similar to the situation where the rotational frequency $f_r$ decreases when the AC-excited synchronous machine 5 is electrically connected to the AC power system 1. The speed correction control unit 24 of the prior art shown in FIG. 5 acts to change the quadrature current command $I_q$ (active power control signal) so as to increase the slip frequency $f_s$ as shown by the two-dot chain line 63 in FIG. 6(b) in order to suppress an increase in the rotational frequence $f_r$ after the shutting off of the load. Therefore, the increase in the slip frequency is accelerated and the slip frequency may go beyond its operable slip frequency range resulting in discontinuation of the self-excitation operation.

Figure 6B:
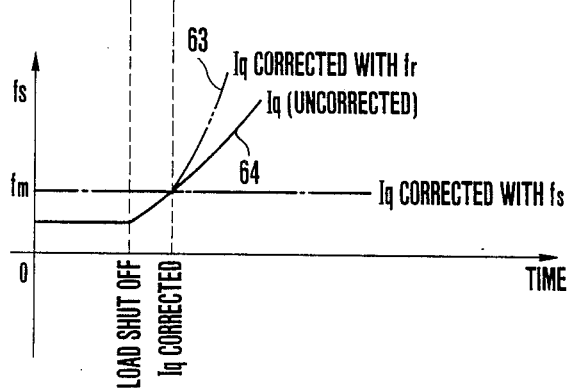

In the first embodiment of FIG. 1, the quadrature current command $I_q$ is corrected, when the slip frequency exceeds a set point so as to restore the slip frequency to the set point as shown by the one-dot chain line in FIG. 6(b). As a result, the self-excitation operating condition $f_o = f_r + f_s$ is determined definitely by the set point of the slip frequency and the rotational frequence $f_r$ adjusted by the prime mover. In the present embodiment, the tachometer 22 of FIG. 5 may be omitted.

Figure 2:
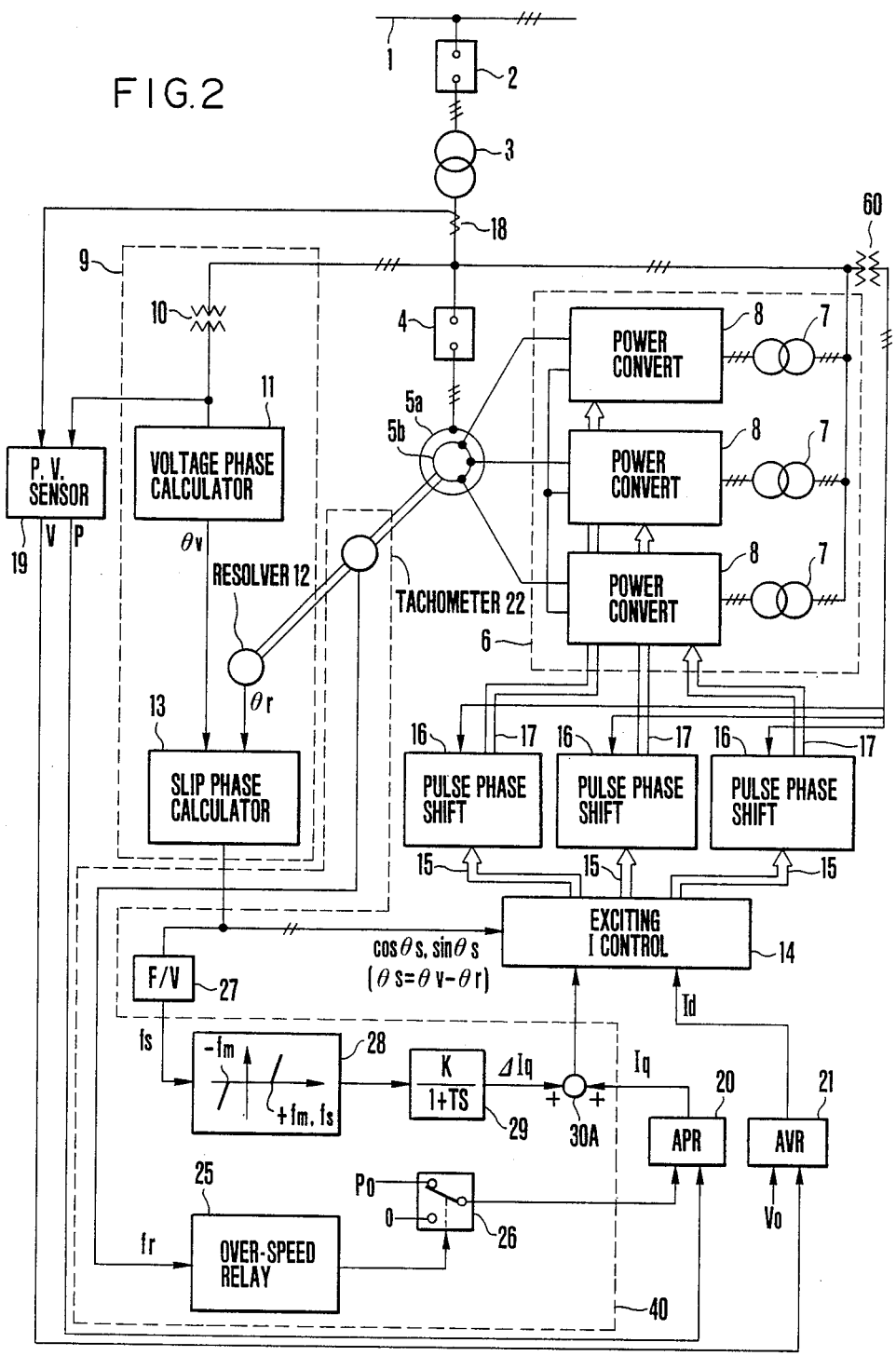
FIG. 2 is a block diagram of an AC-excited generator/motor apparatus as a second embodiment of the present invention.

FIG. 2 illustrates a second embodiment of the present invention in which the output of the dead zone calculator 28 is added by an adder 30A, after being processed by the first-order time-lag calculator 29, to the quadrature current command $I_q$ produced by the automatic active power regulator 20. The output of a tachometer 22 is applied to an over-speed relay 25 such that when the rotational speed of the synchronous machine exceeds a predetermined value, the over-speed relay 25 actuates a changeover unit 26 to switch the active power output command $P_o$ to zero. According to this embodiment, when the synchronous machine 5 is shut off from the AC power system 1, a rapid increase in the rotor speed is sensed and the active power output command $P_o$ is switched to zero. Therefore, the input to the automatic power regulator 20 is nullified and the output of the first-order time-lag calculator 29 is used as the quadrature current command $I_q$, so that the automatic active power regulator 20 is effectively shut off and the quadrature current command $I_q$ is controlled with a control constant suitable for the self-excitation operation.

Figure 3:
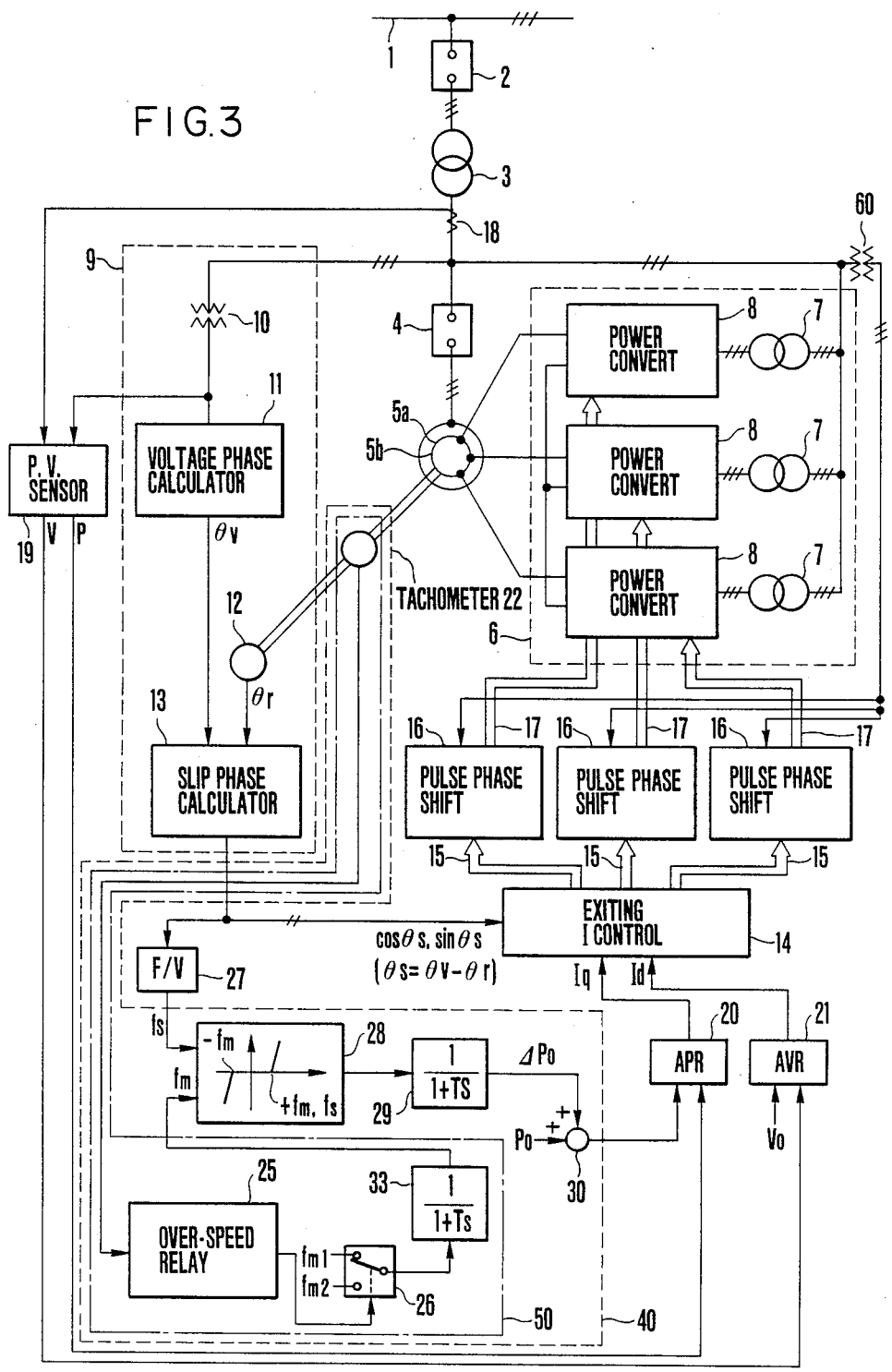
FIG. 3 is a block diagram of an AC-excited generator/motor apparatus as a third embodiment of the present invention.

FIG. 3 illustrates a third embodiment of the present invention in which the slip frequency control unit 40 comprises a slip frequency setting unit 50 which includes a tachometer 22 which detects the rotational speed of the rotor and outputs a signal indicative of the sensed rotational speed, an over-speed relay 25 operated when the rotational speed exceeds a predetermined value, a changeover unit 26 which selects one of two frequency values $f_{m1}$ and $f_{m2}$ predetermined as limits which defines a dead zone width of the dead zone calculator 28 in response to the operation of the over-speed relay 25, and a first-order time-lag calculator 33 which performs a first-order time-lag operation on the selected slip frequency limit $f_{m1}$ or $f_{m2}$. The dead zone width is determined by an output $f_m$ from the slip frequency setting unit 50. The over-speed relay 25 is closed thereby causing the changeover unit 26 to output the value $f_{m2}$ when the rotational frequence $f_r$ detected by the tachometer 22 exceeds a set point which is set at a value higher than a speed at which the synchronous machine is allowed to rotate in the state in which the synchronous machine is connected to the AC power system 1. On the other hand, the over-speed relay 25 is opened in response to the stoppage of the thyristor power converter 8 or the closing of the main circuit breaker 2 thereby causing the changeover unit 26 to output the value of $f_{m1}$. When the over-speed relay 25 is closed, the output. Of the changeover unit 26 changes from $f_{m1}$ to $f_{m2}$. Where the frequencies $f_{m1}$ and $f_{m2}$ are set to satisfy $f_{m1} > f_{m2} > 0$, for example, $f_{m1} = 5$ Hz and $f_{m2} = 3$ Hz. The output of the changeover unit 26 is applied to the first-order time-lag calculator 33 so that its change is moderated, and the resulting output of calculator 33 is applied, to set the dead zone width $-f_m$ to $+f_m$ of the dead zone calculator 28.

According to this embodiment, since the slip frequency $f_s$ is decreased to $f_{m2}$ smoothly by the action of the first-order time-lag calculator 33 after the synchronous machine is shut off from the AC power system 1 and the slip frequency $f_s$ reaches $f_{m1}$, the output voltage of frequency converter 6 can be reduced while the control voltage margin can be increased, so that a stabilized self-excitation operation of the machine is maintained.

FIG. 4 illustrates a fourth embodiment of the present invention which detects the frequency of the armature voltage instead of the rotational speed of the rotor in the third embodiment shown in FIG. 3.

In FIG. 4, a frequency relay 34 receives an output voltage of a frequency detector 35 indicative of the frequency of the armature voltage and operates when the frequency of the armature voltage exceeds a predetermined set value to switch the changeover unit 26. Other operations are similar to the third embodiment shown in FIG. 3. The frequency relay 34 may be closed when the armature frequency $f_o$ exceeds the set point for a time interval longer than a predetermined value. The set frequency value is selected so as to be higher than a maximum allowable value for the AC power system. Frequency relay 34 is opened in response to the stoppage of thyristor power converter 8 or the closing of the main circuit breaker 2.

This embodiment has the effects that the change to the self-excitation mode in operation of the synchronous machine is determined by detecting that the armature frequency $f_o$ exceeds the set value when the synchronous machine is shut off from the AC power system 1, and then the slip frequency $f_s$ is reduced by narrowing the allowable range of slip frequencies, i.e. the dead zone width of the dead zone calculator 28, so that the output voltage of frequency converter 6 can be reduced, the control voltage margin can be increased, and thus a stabilized self-excited machine operation is maintained.

According to the present invention, the AC-excited generator/motor apparatus includes the frequency control unit which delivers a correction signal to the active power regulator so as to suppress possible deviations of the slip frequency from an allowable range thereof when the generator/motor apparatus is shut off from its AC system, so that a rapid increase in the armature voltage frequency in the generator/motor is prevented and a stabilized self-excited apparatus operation is maintained.

We claim:
1. An AC-excited generator/motor apparatus comprising:
   an AC-excited generator/motor having an armature mounting thereon an armature winding connected to an AC power system and a rotor mounting thereon an exciting winding excited by an AC current;
   exciting means for supplying a controlled AC exciting current to the exciting winding;
   means for calculating a real slip frequency corresponding to a difference between a phase of an armature voltage appearing on the armature winding and a rotational phase of the rotor; and
   means for controlling the exciting current supplied to the exciting winding from the exciting means in response to a deviation of the real slip frequency from a predetermined allowable range of slip frequencies so as to restore the real slip frequency within the allowable range.

2. An AC-excited generator/motor apparatus according to claim 1, further including means responsive to a rotational speed of the rotor exceeding a predetermined set value for changing the allowable range of slip frequencies.

3. An AC-excited generator/motor apparatus according to claim 1, further including means responsive to a deviation of a frequency of the armature voltage from a predetermined set value for changing the allowable range of slip frequencies.

4. An AC-excited generator/motor apparatus according to claim 1, further including means for generating an active power control signal based on a given active power command and an active power component transmitted between the AC power system and the armature winding, means for generating a voltage control signal based on the armature voltage and a given voltage command, and means for generating an exciting current control signal to control the exciting current based on the active power control signal and the voltage control signal, and
   said exciting current controlling means including means responsive to the deviation of the slip frequency from the predetermined allowable range of slip frequencies for generating a correction signal to correct the active power command.

5. An AC-excited generator/motor apparatus according to claim 4, wherein the correction signal is determined in accordance with a degree of the deviation of the real slip frequency from the predetermined allowable range of slip frequencies.

6. An AC-excited generator/motor apparatus according to claim 4, further including means responsive to a rotational speed of the rotor exceeding a predetermined set value for changing the allowable range for the slip frequency.

7. An AC-excited generator/motor apparatus according to claim 4, further including means responsive to a deviation of a frequency of the armature voltage from a predetermined set value for changing the allowable range of slip frequencies.

8. An AC-excited generator/motor apparatus according to claim 1, further including means for generating an active power control signal from a given active power command and an active power component transmitted between the alternating current power system and the armature winding, means for generating a voltage control signal from a given voltage command and an output voltage appearing on the armature winding, and means for generating an exciting current control signal to control the exciting current on the basis of the active power control signal and the voltage control signal, and
   said exciting current controlling means including means responsive to the deviation of the slip frequency from the predetermined allowable range of slip frequencies for generating a correction signal to correct the active power control signal.

9. An AC-excited generator/motor apparatus according to claim 8, wherein the correction signal is determined in accordance with a degree of the deviation of the real slip frequency from the predetermined allowable range of slip frequencies.

10. An AC-excited generator/motor apparatus according to claim 8, further including means responsive to a rotational speed of the rotor exceeding a predetermined set value for changing the active power command.

11. An AC-excited generator/motor apparatus according to claim 10, wherein the active power command is changed to zero in response to the rotational speed of the rotor exceeding the predetermined set value.

12. An AC-excited generator/motor apparatus comprising:
an AC-excited generator/motor having an armature mounting thereon an armature winding connected to an AC power system and a rotor mounting thereon an exciting winding excited by an AC current;
exciting means for supplying a controlled AC exciting current to the exciting winding;
means for calculating a real slip frequency corresponding to a difference between a phase of an armature voltage appearing on the armature winding and a rotational phase of the rotor; and
means for reducing the real slip frequency including means for controlling the exciting current supplied to the exciting winding from the exciting means in response to a deviation of the real slip frequency exceeding predetermined value of the slip frequency.

13. An AC-excited generator/motor apparatus comprising:
an AC-excited generator/motor having an armature mounting thereon an armature winding connected to an AC power system and a rotor mounting thereon an exciting winding excited by an AC current;
exciting means for supplying a controlled AC exciting current to the exciting winding;
means for calculating a real slip frequency based on a difference between a phase of an armature voltage appearing on the armature winding and a rotational phase of the rotor; and
means for controlling the exciting current supplied to the exciting winding from the exciting means in response to a deviation of the real slip frequency exceeding a predetermined value of the slip frequency.

14. An excitation control system for use with an AC-excited generator/motor apparatus having an armature mounting thereon an armature winding connected to an AC power system and a rotor mounting thereon an exciting winding excited by an AC current, said control system comprising:
exciting means for supplying a controlled AC exciting current to the exciting winding;
means for generating an active power control signal based on an active power command and an active power component transmitted between the AC power system and the armature winding;
means for generating a voltage control signal based on an armature voltage appearing on the armature winding and a given voltage command;
means for generating an exciting current control signal applied to the exciting means to control the exciting current based on the active power control signal and the voltage control signal;
means for calculating a real slip frequency corresponding to a difference between a phase of the armature voltage and a rotational phase of the rotor of the AC-excited generator motor;
means responsive to a deviation of the real slip frequency from a predetermined allowable range of slip frequencies for controlling the active power control signal so as to restore the real slip frequency within the allowable range of slip frequencies.

15. An excitation control system according to claim 14, wherein the controlling means includes means responsive to the deviation of the real slip frequency from the predetermined allowable range of slip frequencies for generating a correction signal and means for correcting the active power command by the correction signal.

16. An excitation control system according to claim 15, further including means responsive to a rotational speed of the rotor exceeding predetermined set value for changing the allowable range of slip frequencies.

17. An excitation control system according to claim 15, further including means responsive to a frequency of the armature voltage exceeding predetermined set value for changing the allowable range of slip frequencies.

18. An excitation control system according to claim 14, wherein the controlling means includes means responsive to the deviation of the real slip frequency from the predetermined allowable range of slip frequencies for generating a correction signal and means for correcting the active power control signal by the correction signal.

19. An excitation control system according to claim 18, further including means responsive to a rotational speed of the rotor exceeding a predetermined set value for changing the value of the active power command.

* * * * *